United States Patent Office 3,004,721
Patented Oct. 17, 1961

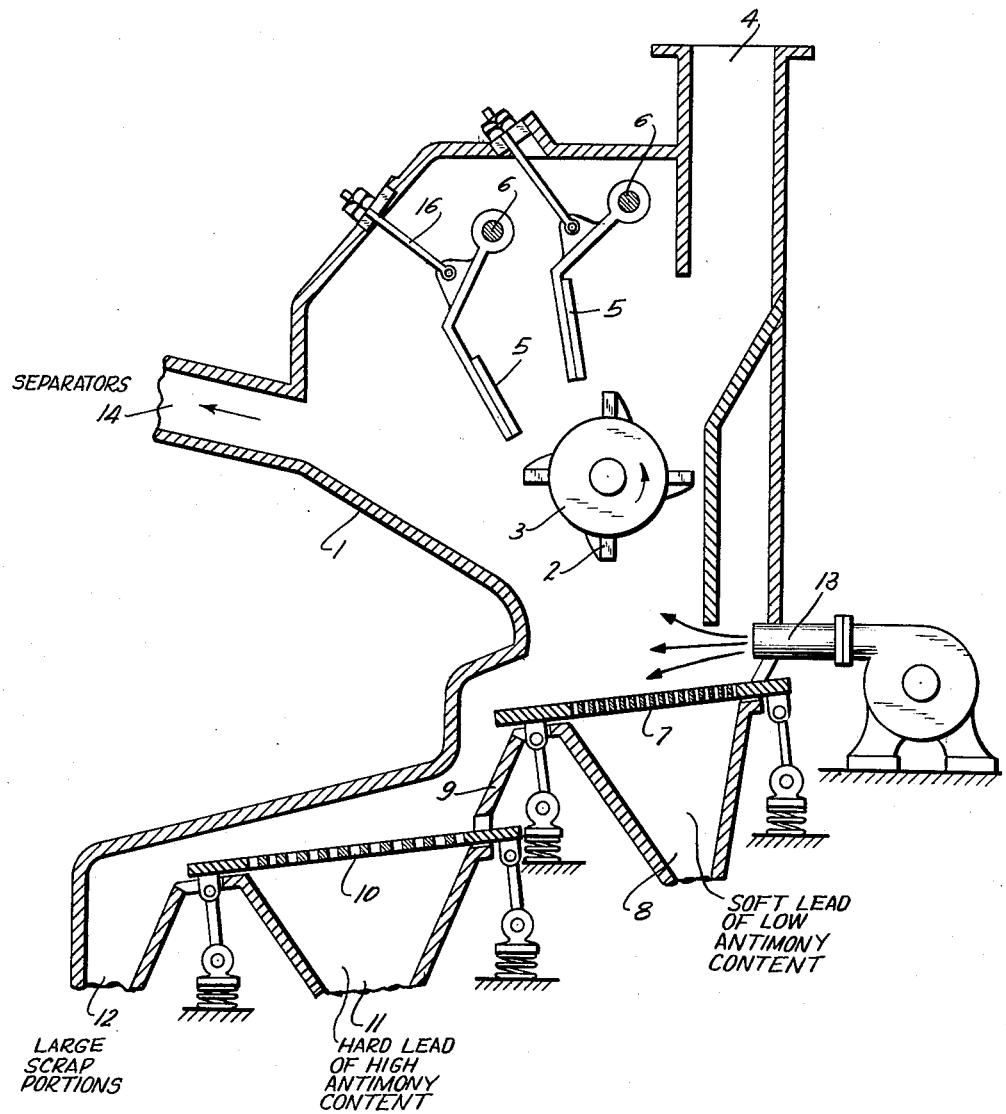

3,004,721
SCRAP COMMINUTING AND SORTING PROCESS
Odo Nötzold, Karnten, Austria, assignor to Hazemag Hartzerkleinerungs- und Zement-Maschinenbau-Gesellschaft m.b.H., Munster, Westphalia, Germany
Filed Sept. 10, 1957, Ser. No. 683,138
Claims priority, application Germany Sept. 10, 1956
3 Claims. (Cl. 241—5)

The present invention relates to the comminution of scrap made up of widely different components, such as storage battery scrap.

Such battery scrap consists essentially of four parts: firstly soft lead derived from the terminals, straps and connecting links, secondly active material of the plate consisting of metallic lead dust and lead compounds, lead oxide or lead sulphate depending on the degree to which the battery is discharged, thirdly hard lead, orginating from the plates, with an antimony contents of 7.5 to 8%, and finally the separators which formerly consisted of poplar wood but now are frequently made of synthetic material. The first constituent is a mixture of solid pieces of terminals etc., which can be sorted by hand without difficulty; the active material may be gritty to powdery, and if the scrap is unsufficiently dried, pasty or even slimy; the hard lead portion consists of broken pieces of grid to whole plates, and finally the separators are generally in their original laminar form so that they too can often be easily sorted. High wages and the fact that the scrap often contains whole assemblies of plates make this sorting uneconomical.

Simple melting of the scrap has the disadvantage that, from the hard lead of the plates with its antimony content and the soft lead and the active material, which are practically free of antimony, an alloy is formed, having an antimony content of about 2 to 3%, which is difficult to utilize.

It is generally uneconomical to refine out the antimony; the alternative of producing a hard metal with an antimony content of 7.5 to 8% by the addition of antimony had the disadvantage that as a result, considerably more hard lead for plates is obtained than the market can absorb for the current manufacture of new batteries.

As regards the separators, the former ones of wood do not involve any difficulties because they burn away without any residue whenever they are heated; but the new ones of synthetic material only smolder when the scrap is melted and cause very disturbing precipitations and agglutinations, particularly in the filter equipment. They must, therefore be removed before melting the comminuted or unprepared scrap, and, with high wages, this results in high costs. A metallurgical smelting process cannot be avoided, however, because a large part of the scrap has to be regenerated thereby. Attempts to carry out a mechanical sorting for the scrap into its above-mentioned constituents, before this smelting, have hitherto not been satisfactory, while if the grids and the parts thereof are liquidated from the active material, too much antimony is lost through oxidation.

One of the objects of the present invention is to overcome the above drawbacks by providing a process capable of quickly and effectively sorting materials under the above conditions.

Another object of the present invention is to provide a process particularly suitable for the treatment of storage battery scrap.

A further object of the present invention is to provide a process and apparatus capable of automatically separating storage battery scrap into three groups of materials, one group being relatively large pieces which can be easily removed by hand, the second group being predominantly soft lead with a low antimony content, and the third group being hard lead in coarser grains than the soft lead and having a high antimony content.

With the above objects in view the present invention includes in a process for comminuting storage battery scrap or the like, the steps of exposing the scrap, without any preliminary treatment or sorting out of the individual constituents thereof, to a centrifugal impact comminuting action, and then screening the comminuated material at least once.

The novel features which are considered as characteristic for the invention are set forth in particular in the appended claims. The invention itself, however, both as to its construction and its method of operation, together with additional objects and advantages thereof, will be best understood from the following description of specific embodiment when read in connection with the accompanying drawing.

In accordance with the present invention the scrap batteries are comminuated in a centrifugal impact mill to produce a selective comminution. In centrifugal impact mills, the raw material supplied to a rapidly rotating bladed impeller is thrown by centrifugal force against impact plates which are arranged round the impeller in such a manner that, at least over a considerable arc of the circumference of the impeller there is a space between it and the impact plates, which space is generally wedge-shaped and through which the centrifuged material flows freely to impinge on the impact plates with considerable force. In such mills, the comminution is brought about in several ways; in the first place by the rapidly rotating impeller blades striking against the material coming within their reach, then by the material striking the impact plates and then by the frequent repetition of both processes, the rebounding material being again seized by the impeller blades and again thrown out, to bounce back again and be thrown out again, which is repeated continuously until sufficient comminution has taken place.

It is obvious that an essential feature of this centrifugal impact comminution consists in that components of the material which have become small or flaky, or laminar or fibrous, are not further comminuated because they are no longer able to gain sufficient kinetic energy to cross through the free space between the beaters and the impact plates, or because there is too much air resistance to them there. Accordingly, it is generally considered that centrifugal impact comminution is not suitable for hard comminution below a certain grain size, and that a selective action of considerable extent is to be expected if the material being ground contains constituents having very different properties, particularly as regards density. Now apart from the separators which are of minor importance, this does not apply to the various constituents of the scrap accumulators: active material, soft lead and hard lead containing antimony only differ slightly in weight, so that no selective action would be expected during comminution. On the other hand, the hardness of these various materials is very different, as the very designation of two of them indicates. If there should be a difference in the comminuting results, however, it would be assumed that this would be compensated for by the different sized pieces (lumps or small, partially powdered particles) which occur in both constituents in amounts which vary in an exteremely haphazard manner. It would further be expected that impact comminution would deliver the hard lead in finer grains than the soft lead or the active material, because according to calculations and previous experience, on the average, a material is comminuated to the greater extent by impact action the harder and more brittle it is. This fact also suggests that subjecting scrap batteries to a centrifugal impact comminution would have no beneficial results, because in the course of comminution, the plates would, primarily, be ground, while the material which was actually partially powdered already would remain uncomminuted as regards the actual pieces (the terminals and the like) so that, as a whole, no uniform ground product would be obtained.

Surprisingly, however, experiments have shown that precisely the opposite results are obtained, and that in fact the parts of soft lead and of active material are comminuted to a considerably greater extent and substantially evenly, while the hard lead originating from the plates retains a noticeably larger average grain size. This result, which is surprising at first glance, may possibly be explained by the fact that comminution also takes place as a result of a third action, namely as a result of the parts of the material being ground by impingement upon one another. It is known, per se, that metals, particularly soft metals, such as are used for bronze colors, can be satisfactorily comminuted down to the finest grain size by throwing similar grains of metal against one another by means of streams of compressed air. The fact that, when grinding in centrifugal impact mills with impellers, which throw hard and soft types of metal together there is such an impingement of the various pieces and grains against one another that the softer metal is ground considerably finer than the hard, must, however, be regarded as contrary to all expectation.

Nevertheless, this result has clearly been obtained. On the average, the hard lead produced larger grains than the soft lead and the active material, and if grading was carried out according to the grain size, then the coarse-grained material had an antimony content of 6.5 to 7.5% while the fine-grained material on the other hand, had an antimony content of only 0.6 to 0.7 and even down to 0.3% antimony in special cases starting from smooth, dry scrap in pieces. Thus a raw material was obtained which was very suitable for the production of soft lead and which only required a little expenditure on refining, while, on the other hand, only a considerably smaller amount of antimony needed to be added to the coarse-grained hard material, in order to form a normal alloy for grid plates.

The present invention utilizes completely unexpected results obtained during these experiments, and it is thus characterized in that scrap batteries, without any preliminary treatment or sorting of individual components beforehand, are exposed to a centrifugal impact comminuting process which is preferably followed by a single or repeated screening. Air grading may also be carried out before or after screening, but is often sufficient to use the air movement produced by the centrifugal means during centrifuging for this purpose.

The method of the present invention may be carried out in separate stages in known devices, that is to say first the comminution in a centrifugal impact mill, then perhaps the air grading, and after that the screening on screening equipment of any desired construction. It is also possible, however, to use a machine specially adapted to the method of the present invention, and accordingly the present invention further relates to a machine wherein a centrifugal impact mill, which may be adapted for air grading, is combined directly with a screening apparatus.

Referring to the drawing, it will be seen that mounted in the housing 1 is a high-speed impeller 3 which is equipped with blades 2 and to which the raw scrap is supplied through a feed chute 4. The impeller 3 has its shaft rotatably carried by bearings supported by the side walls of the housing 1, and any suitable motor is connected with the impeller shaft to rotate the impeller at high speeds in a counterclockwise direction, as viewed in the drawing. Impact plates 5 are mounted in such a manner that one of their edges reaches close to the impeller while the other, the upper edge, is a considerable distance therefrom. As a result, between the impeller and each impact plate there is formed a wedge-shaped space which terminates in the direction of rotation of the impeller, in a gap parallel to the impeller axis, and through which space the material is thrown by the blades 2 against the impact plates 5 and back again by the plates onto the impeller.

In view of the extremely uneven nature of the scrap, it is an advantage if the impact plates are pivotally suspended, on shafts 6 which are carried by the housing 1 parallel to the axis of the impeller, and which are at a considerable distance in front of the planes in which the individual impact surfaces lie, particularly the bottom parts thereof situated closest to the impeller. As a result, a rapid, jaw-like opening of the gap between the impeller and the lower edge of the impact plates is rendered possible, in the event of the mill being overfilled or of a foreign body being present which cannot be comminuted, such as is sometimes contained in storage battery scrap. Stops 16 pivoted to the impact plates cooperate with the casing 1 to limit the inward movement of the impact plates.

The stops 16 are pivotally connected at their lower ends to the angled arms which carry the plates 5, and the stops 16 are in the form of elongated bars extending with considerable clearance through openings formed in the wall of the housing 1. Each stop bar 16 threadedly carries a pair of lock nuts at the exterior of the housing to limit adjustably the inward movement of each bar into the housing, the clearance of each bar in the opening of the housing wall being sufficient to permit each stop bar to turn freely without jamming or binding at the housing wall when the plate 5 turns.

An inclined vibration screen 7 feeds material to the outlet 8 and is arranged in the lower outlet of the housing 1. A chute 9 leads from the lower edge of this screen 7 to a second vibratory screen 10 of coarser mesh which has an outlet 11 and an overflow 12. A blower delivery pipe 13 leads into the housing 1 above the screen 7 and is opposite an outlet pipe 14, which is preferably situated somewhat higher than the pipe 13, is of greater width, and leads out of the housing 1. The vibratory screens 7 and 10 are of a conventional construction. Thus, they may be mounted on suitable springs, and motor-driven eccentric members may have their motion transmitted to the screens, respectively, by bars or the like engaging the eccentrics and connected to the screens respectively.

The battery scrap supplied through chute 4 is comminuted between the beaters 2 and the impact plates 5. The separators or parts thereof are scarcely broken up to any noticeable extent because, in view of their low weight and their large surface in relation to their mass, they are scarcely ever slung onto the impact plates 5 and never bounce back from these onto the beaters. At the most they are somewhat broken up or disintegrated, because each such piece is practically only caught once by a blade 2, namely by the blade which strikes it as it drops down from the feed chute 4. Consequently, these separator parts are caught by the current of air produced by the impeller 3, and even more so by the blower air flowing from the pipe 13, and are carried away through the outlet pipe 14.

The remaining scrap, which consists almost exclusively of lead, drops onto the vibratory screen 7 as soon as it has been comminuted to a grain size small enough to prevent it from being thrown by the blades 2 against the impact plates 5 or vice versa. Fines are screened out on the screen 7 and drawn off in the outlet 8, and the rest falls onto the second, coarser screen 10, to be screened into the outlet 11. The rest is taken off through the outlet 12. Uncomminuted scrap and foreign bodies reach this outlet 12 if the gap between the beaters 2 and impact plates 5 is temporarily opened. The foreign bodies are removed, and the scrap which has not yet been comminuted is returned to the feed chute 4, for which purpose a return device may be provided between the outlet 12 and the feed chute 4, in order to effect the return automatically.

In many cases the nature of the battery scrap may render the reverse arrangement of the screens more advantageous, that is to say an arrangement where the fineness of the mesh increases with the passage of the material being screened, instead of decreasing as in the example described above. This is particularly so when the scrap is very moist. Then the active material tends to adhere to the grid parts made of hard lead, and a fine screen easily allows pasty material to stick to it so that its spaces become clogged.

If such a scrap is first conveyed over a coarse screen, the grid portions are here first largely freed of the active material adhering thereto, particularly if a vibrating screen of known type is used. The overflow from this coarse screen then contains predominantly hard lead containing antimony and soft lead from the terminals and straps. This amount of soft lead will always be very small, however, because experience has shown that the soft lead is rapidly and finely comminuted and accordingly the first, coarse screen, screens out the greater part, because it absorbs considerably less moisture than the active material and is therefore drier or quickly dries as it runs over this screen. The overflow from the first coarse screen thus yields the ray material of hard lead containing about 6% antimony and more so that, as already mentioned, only a small addition of antimony is necessary in order to obtain the necessary antimony content of 7.5% to 8% in the fresh material. The material which passes through the coarse screen contains, in addition to mainly soft lead from comminuted parts of terminals and the like as well as of active material, some small parts of hard lead, which originate primarily from grids of positive plates damaged by corrosion. These small parts of hard lead are now held back on a fine-mesh screen and pass, as its overflow, to the material containing antimony overflowing from the first coarse screen, while the material which passes through the fine second screen now represents the raw material, which is poor in antimony, for the manufacture of fresh soft lead.

Particularly with this second mode of screening, with a coarse screen first and then a fine one, it is of advantage to arrange the screens one above the other so that the material which passes through the upper coarse screen covers the whole expanse of the finer screen beneath it.

Hand sorting is reserved for parts which have remained exceptionally large, particularly those of soft lead from the terminals etc. This hand sorting is, however, restircted to a comparatively few individual cases and to foreign bodies. Such minor hand sorting does not involve heavy costs, because the whole preparation of the battery scrap always requires constant supervision, since exceptional and unforseeable circumstances may always occur. Such hand sorting can thus be carried out without difficulty by the operaor supervising the work.

As already explained, operational results have shown that the fine material collected from the outlet 8 is predominantly soft lead with a low antimony content, while the coarse material obtained from the outlet 11 is primarily hard lead with a high antimony content.

It will be understood that each of the elements described above, or two or more together, may also find a useful application in other types of sorting process and apparatus differing from the types described above.

While the invention has been illustrated and described as embodied in storage battery scrap sorting process and apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A scrap comminuting and sorting process comprising the steps of exposing to a centrifugal impact comminuting action storage battery scrap made up essentially of four parts, all haphazardly arranged, as follows: firstly soft lead derived from the terminals, straps and connecting links, secondly active material of the plate consisting of metallic lead dust and lead compounds, lead oxide or lead sulphate depending on the degree to which the battery is discharged, thirdly hard lead, originating from the plates, with an antimony content of 7.5 to 8%, and finally the separators, said impact comminuting action reducing the soft lead and active material to a relatively fine granular size, the hard lead to a relatively coarse granular size, the separators to pieces of relatively large size, and the residue of the scrap to relatively large scrap portions larger than the coarse hard lead granules; removing from the impact comminuting action substantially all of the separator pieces while the remaining scrap is still exposed to the comminuting action and before said remaining scrap is screened; first screening, after said removal of the separator pieces, the soft lead and active material of fine granular size from the remainder of the comminuted material made up substantially of the coarse hard lead and relatively large scrap portions; then screening the coarse hard lead from said relatively large scrap portions; and finally removing the latter relatively large scrap portions which are not screened.

2. A process as recited in claim 1 and wherein said soft lead and active material of fine granular size which is screened from the coarse hard lead and the relatively large scrap portions has an antimony content of between 0.3 and 0.7%.

3. A process as recited in claim 1 and wherein said first screening of said soft lead and active material of fine granular size is carried out with a screen of a mesh finer than a second screen used for the screening of the coarse hard lead.

References Cited in the file of this patent

UNITED STATES PATENTS

| | | |
|---|---|---|
| Re. 4,446 | Smith | June 27, 1871 |
| 139,782 | Goodhart | June 10, 1873 |
| 256,073 | Taggart | Apr. 14, 1882 |
| 372,016 | Davis | Oct. 25, 1887 |
| 736,346 | Baker | Aug. 18, 1903 |
| 881,296 | Briddon et al. | Mar. 10, 1908 |
| 1,293,654 | Adams | Feb. 11, 1919 |
| 1,393,092 | Davis | Oct. 11, 1921 |
| 1,458,387 | Bourne | June 12, 1923 |
| 1,593,491 | Gerson | July 20, 1926 |
| 1,631,423 | Lucas | June 7, 1927 |
| 2,110,850 | Symons | Mar. 8, 1938 |
| 2,189,711 | Eigenbrot | Feb. 6, 1940 |
| 2,383,045 | Den Breejen | Aug. 21, 1945 |
| 2,474,314 | Koehne | June 28, 1949 |
| 2,808,929 | Fisher | Oct. 8, 1957 |

FOREIGN PATENTS

| | | |
|---|---|---|
| 8,183 | Great Britain | Apr. 8, 1902 |